2,693,449

SILICONE GREASES

George M. Hain, Cincinnati, Ohio, and William A. Zisman, Washington, D. C.

No Drawing. Original application August 13, 1948, Serial No. 44,208. Divided and this application September 23, 1949, Serial No. 117,491

7 Claims. (Cl. 252—42.1)

(Granted under Title 35, U. S. Code (1952), sec. 266)

This application is a division of our co-pending application, Serial No. 44,208, filed August 13, 1948, now abandoned.

This invention relates to silicone greases and particularly to high temperature silicon greases containing an antioxidant.

As in the aforesaid parent application, reference is here also made to our Patent, U. S. 2,446,177, issued August 3, 1948, for a silicone grease and method of preparation.

It is the general object of this invention to provide special lubricating compositions stable at high temperature, particularly temperatures in the neighborhood of 150° C. and higher.

It is the particular object of this invention to provide such lubricating compositions as will effect resistance to oxidation for periods of time of an entirely different order of magnitude from that characterizing known high temperature lubricating compositions.

Accordingly, the invention comprises a series of lubricating compositions containing organo-silicon polymers, lithium stearate and phenothiazine.

One glass of organo-silicon compounds is illustrated by polymeric compositions of the following general structure:

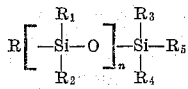

in which, R, $R_1$, $R_2$, $R_3$, $R_4$ and $R_5$ represent any alkyl, aryl, alkaryl or aralkyl radicals and $n$ is any whole number greater than 1. These compounds are available in the form or more or less viscous, oil-like fluids, and in general, are water-white and chracterized by such properties as great thermal stability and high viscosity index. Relatively common compounds of this type are dimethyl silicone, diethyl silicone, ethyl methyl silicone, di-phenyl silicone, di-tolyl silicone, phenyl tolyl silicone, methyl phenyl silicone, ethyl phenyl silicone and alkyl aryl silicone polymers. Compounds like these named and methods for preparing them are described United States Patents 2,352,974, 2,258,222, 2,258,219 and 2,371,068.

Although silicones seem to have physical properties possessed by our best mineral oils, they are not, in general, usable for purposes of lubrication because in many cases they do not protect the lubricated surfaces from corrosion and, in addition, frequently they simply do not lubricate sliding contacting metal surfaces. For example, dimethyl silicone polymer, having a viscosity of about 70 centistokes at 25° C., one of the most common fluids corresponding to the above general formula, has no inherent rust inhibiting value such as that possessed by many hydrocarbon oils and it will be found that it is not a good boundary lubricant and seizure at low loads will occur in bearings employing it as a lubricant.

The conversion of silicone fluids into grease compositions may be effected in various ways such as, for example, have been described in our Patent, U. S. 2,446,177, supra, and in our parent application supra. The general properties of these greases are also set out in said patent and said parent application. Suitable corrosion inhibitors for said greases are disclosed in U. S. Patent 2,447,483, issued August 24, 1948, to Baker et al. The anti-corrosion properties of the silicone greases, with and without corrosion inhibitors are shown in our parent application.

This invention relates to compositions based on these silicone greases which are particularly characterized in high oxidation resistance.

It has been found that lubricating compositions comprising an organo-silicon base fluid, a minor amount of lithium stearate (preferably from about 5% to about 30%) and from about 0.2% to about 3% of phenothiazine, possess a remarkable resistance to oxidation. The results of the co-action between phenothiazine and the base grease blend in producing an oxidation resistant composition is entirely disproportionate to what would be expected from the known properties of phenothiazine, relative to oxidation inhibition, and from the inherent oxidation resistance of the silicone greases. Applicants are unaware of any physico-chemical theory which would have led to prediction of this phenomenal result or which, now that it has been empirically demonstrated, can explain it.

To illustrate the oxidation resistant properties of this class of compositions the following test data are shown comparing the oxygen absorption of a simple silicone grease (blend of organo-silicon polymer and lithium stearate) with that of such a combination containing additionally small quantities of phenothiazine.

Thus composition "A" consisted of 83% methylphenyl silicone copolymer and 17% lithium stearate. Composition "C" consisted of 82% methylphenyl silicone copolymer, 17% lithium stearate and 1% phenothiazine.

The tests were run in a Norma-Hoffman bomb, a twenty-gram sample of each grease being placed in a bomb in an atmosphere of oxygen under an initial pressure of 110 p. s. i. The bombs were held constantly at 150° C., the pressure measured at intervals and the pressure drop recorded. The results are shown in Table I.

TABLE I

| Time, hrs. | Pressure Drop in p. s. i. | |
|---|---|---|
| | A | C |
| 0 | 0.0 | 0.0 |
| 5 | 0.0 | 0.0 |
| 10 | 1.0 | 0.0 |
| 15 | 2.0 | 0.0 |
| 20 | 4.0 | 0.0 |
| 25 | 6.0 | 0.0 |
| 30 | 8.0 | 0.0 |
| 35 | 11.0 | 0.0 |
| 40 | 13.0 | 0.0 |
| 45 | 16.5 | 0.0 |
| 50 | 19.0 | 0.0 |
| 55 | 21.0 | 0.0 |
| 60 | 24.0 | 0.0 |
| 65 | 25.0 | 0.0 |
| 70 | 28.0 | 0.0 |
| 75 | 30.5 | 0.0 |
| 80 | 33.0 | 0.0 |
| 85 | 35.0 | 0.0 |
| 90 | 37.0 | 0.5 |
| 95 | 39.5 | 1.0 |
| 100 | 41.0 | 1.0 |
| 105 | 43.0 | 1.0 |
| 110 | 44.5 | 1.0 |
| 115 | 45.5 | 1.0 |
| 120 | 46.0 | 1.0 |
| 125 | 47.0 | 1.0 |
| 130 | 48.0 | 1.0 |
| 135 | 49.0 | 1.0 |
| 140 | 50.0 | 1.0 |
| 145 | | 2.0 |
| 150 | | 2.0 |
| 155 | | 3.0 |
| 160 | | 4.0 |
| 165 | | 4.0 |
| 170 | | 5.0 |
| 175 | | 5.0 |
| 180 | | 6.0 |
| 185 | | 7.0 |
| 190 | | 8.0 |
| 195 | | 8.0 |
| 200 | | 8.5 |
| 205 | | 9.0 |
| 210 | | 9.0 |
| 215 | | 9.5 |
| 220 | | 9.0 |
| 225 | | 10.0 |
| 230 | | 10.0 |
| 235 | | 10.5 |
| 240 | | 10.5 |

| Time, hrs. | Pressure Drop in p. s. i. | |
|---|---|---|
| | A | C |
| 245 | | 11.0 |
| 250 | | 12.0 |
| 255 | | 12.0 |
| 260 | | 12.5 |
| 265 | | 12.0 |
| 270 | | 12.5 |
| 275 | | 13.0 |
| 280 | | 13.5 |
| 285 | | 14.0 |
| 290 | | 13.0 |
| 295 | | 13.5 |
| 300 | | 13.5 |
| 305 | | 13.0 |
| 310 | | 13.0 |
| 315 | | 13.0 |
| 320 | | 13.0 |
| 325 | | 14.0 |
| 330 | | 14.0 |
| 335 | | 15.0 |
| 340 | | 14.5 |
| 345 | | 15.0 |
| 350 | | 16.0 |
| 355 | | 16.0 |
| 360 | | 15.5 |
| 365 | | 15.0 |
| 370 | | 16.0 |
| 375 | | 16.0 |
| 380 | | 16.5 |
| 385 | | 16.0 |
| 390 | | 16.0 |
| 395 | | 16.0 |
| 400 | | 16.0 |
| 405 | | 16.0 |
| 410 | | 17.0 |
| 415 | | 18.0 |
| 420 | | 18.0 |
| 425 | | 18.5 |
| 430 | | 18.5 |
| 435 | | 19.5 |
| 440 | | 19.5 |
| 445 | | 19.5 |
| 450 | | 20.0 |
| 455 | | 20.5 |
| 460 | | 20.0 |
| 465 | | 19.5 |
| 470 | | 19.5 |
| 475 | | 19.5 |
| 480 | | 20.0 |
| 485 | | 20.0 |
| 490 | | 20.0 |
| 495 | | 20.5 |
| 500 | | 20.5 |
| 505 | | 21.5 |
| 510 | | 21.5 |
| 515 | | 21.5 |
| 520 | | 21.5 |
| 525 | | 22.5 |

Since certain changes may be made in the compositions of the invention and changes made in the method of their preparation and different embodiments of the invention can be made by varying the fluid used as the base, the soap, the antioxidants and corrosion inhibitors, it is intended that all matter contained in the above description and examples shall be interpreted as illustrative and descriptive only and not in a limiting sense.

Whereas the composition is made up almost entirely of the ingredients recited in the claims and these ingredients are the main and characterizing ones, it is not intended to exclude the presence of minor amounts of other ingredients which are commonly employed in lubricating compositions or which are merely inert. Such added ingredients would not change the essential character of the composition or take it out of the scope of the invention.

The invention described herein may be manufactured and used by or for the Government of the United States of America for governmental purposes without the payment of any royalties thereon or therefor.

What is claimed is:

1. A lubricating grease comprising from about 70% to about 95% by weight of an organo-silicon polymer, from about 5% to about 30% by weight of lithium stearate, and from about 0.1% to about 3% by weight of phenothiazine.

2. A lubricating grease comprising essentially from about 70% to about 90% by weight of an organo-silicon polymer characterized by the formula:

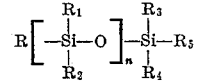

in which R, R₁, R₂, R₃, R₄ and R₅ represent any alkyl, aryl, alkaryl and aralkyl radicals and $n$ is a whole number greater than 1, blended with about 5% to 30% by weight of lithium stearate, and from 0.1% to about 3% by weight of phenothiazine.

3. A lubricating grease consisting essentially of about 82% by weight of methylphenyl silicone polymer, about 17% by weight lithium stearate, and about 1% by weight phenothiazine.

4. A lubricating grease comprising a major amount of an organo-silicon polymer fluid, a minor amount of a lithium soap sufficient to thicken the fluid to a grease consistency and a minor amount of phenothiazine sufficient to increase the oxidation resistance of the grease.

5. A lubricating grease comprising a major amount of an organo-silicon polymer fluid, a minor amount of a lithium soap sufficient to thicken the fluid to a grease consistency and from about 0.1% to about 3% by weight of phenothiazine.

6. A lubricating grease comprising a major amount of an organo-silicon polymer fluid, a minor amount of lithium stearate sufficient to thicken the fluid to a grease consistency and a minor amount of phenothiazine sufficient to increase the oxidation resistance of the grease.

7. A lubricating grease comprising a major amount of an organo-silicon polymer fluid, a minor amount of lithium stearate sufficient to thicken the fluid to a grease consistency and from about 0.1% to about 3% by weight of phenothiazine.

References Cited in the file of this patent

UNITED STATES PATENTS

| Number | Name | Date |
|---|---|---|
| 2,006,756 | Bartram | July 2, 1935 |
| 2,190,648 | Cantrell et al. | Feb. 20, 1940 |
| 2,220,723 | Lewis | Nov. 5, 1940 |
| 2,224,158 | Marks | Dec. 10, 1940 |
| 2,446,177 | Hain et al. | Aug. 3, 1948 |